3,553,002
THERMAL PROTECTION ABLATION
SPRAY SYSTEM
William M. Haraway, Jr., Hampton, and Robert T. Magee, Newport News, Va., assignors to the United States of America as represented by the Administrator of National Aeronautics and Space Administration
Filed July 31, 1967, Ser. No. 657,742
Int. Cl. B44d 1/08; C03c 25/02
U.S. Cl. 117—104          5 Claims

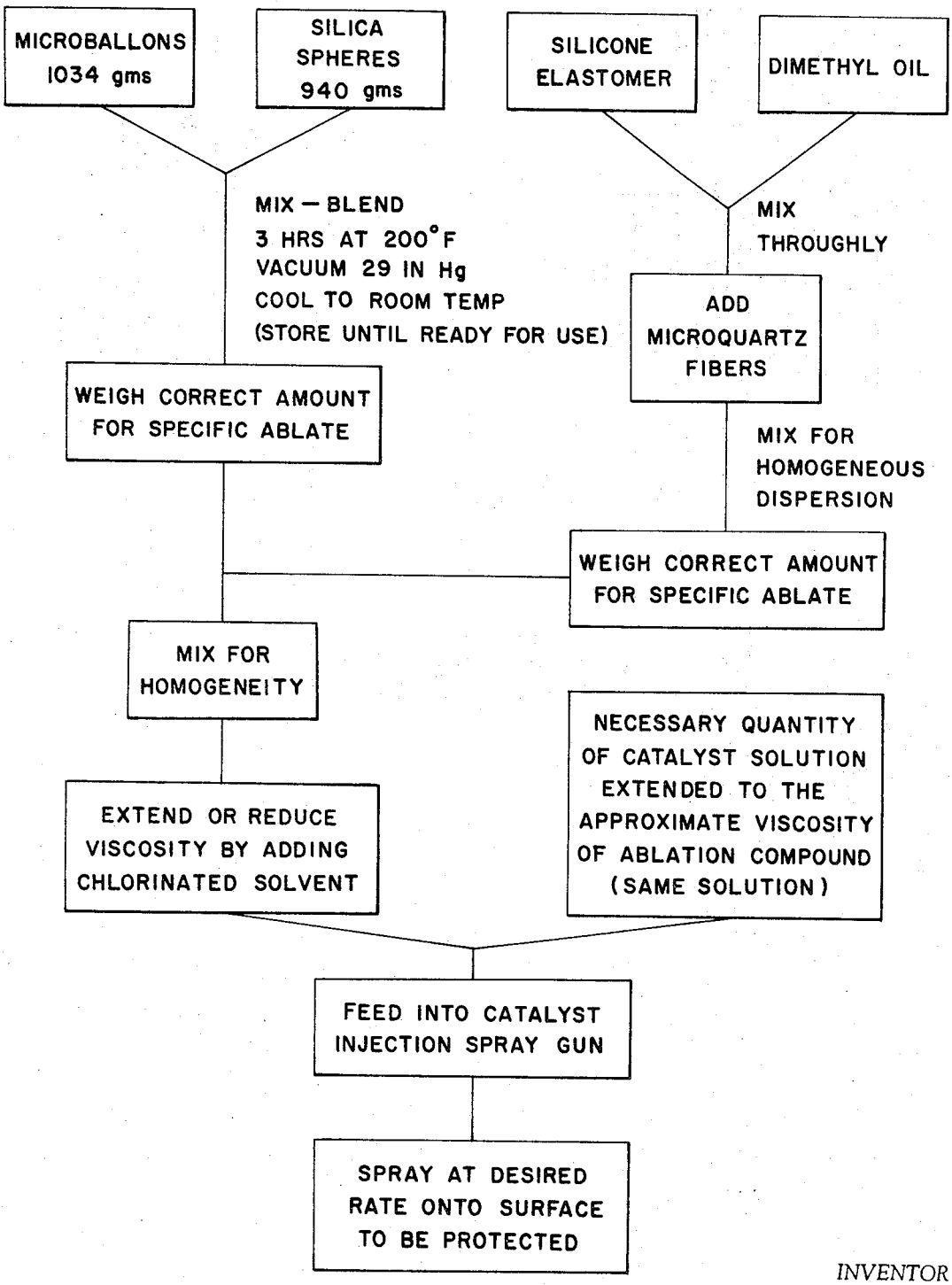

ABSTRACT OF THE DISCLOSURE

This invention relates to a method of making and applying a sprayable fiber reinforced ablation material having a variety of fragile filler ingredients therein.

---

The invention described herein was made by employees of the United States Government and may be manufactured and used by or for the United States Government without the payment of any royalties thereon or therefor.

This invention relates generally to a thermal protection ablation spray system and relates in particular to a method of making and applying a sprayable fiber reinforced ablation material having a variety of fragile ingredients therein.

Previously, when making ablation coatings or bodies from materials having fragile and other filler ingredients therein, it has been necessary to provide very expensive matching pressure molds or dies for casting the sheet ablation material which is then cut in the desired shapes and adhesively bonded to the vehicle on which ablation protection is desired. This prior art process requires a vacuum technique with the mix composition being de-aerated and cast in a single operation by drawing it from an atmospheric pressure environment into a vacuum chamber through small diameter vacuum port tubes. The rate of flow in this process is controlled by hand valves on the outside of the chamber and as the material is drawn by the pressure differential it is allowed to free fall from the tube end onto a mold plate. During the free fall phase, the entrapped air in the material is drawn off by a vacuum pump. A second plate is installed in the chamber and lowered to compress the material to the proper thickness. Contour shapes are also cast using variations of the same method in conjunction with machine dies. An adhesive, employing the uncured ablation material in conjunction with a fast cure catalyst, is used to adhesively bond the ablation material to the vehicle surfaces. Prior to this bonding operation however, the surfaces of the vehicle must be solvent-cleaned and primed with a suitable primer and the adhesive is then applied and the sheet material placed in position and smoothed by roller techniques using contact pressure only. The adhesive bond is allowed to cure overnight at room temperature and the ablation coating for the vehicle is obtained.

Obviously, there are numerous disadvantages in this prior art process, such for example, requiring machined molds and dies, size limitations due to the processing equipment required and the limited working life of the mix material due to the catalyst addition at the beginning of the mixing cycle requires that the process to be completed once begun and may involve overtime for expensive help. In addition, the cast ablation material cannot be gradated, that is, the casting technique provides a constant or uniform density in the composition throughout the material, and overnight cures in the molds before the molds may be opened is also required. In addition to these disadvantages, this molding technique also has the obvious disadvantageous inability to produce changes in thickness of the material at critical points on the vehicle, without creating a discontinuity in surface smoothness, since cast sheets must be trimmed and fitted to provide proper fit with the preceding piece of material attached to irregular surface shapes, contours or projections during the bonding operation. The resulting numerous seams and joints of the bonded ablation material sheets used on contoured parts increases the possibility of innerface lamination shearing during reentry or upon exposure of the vehicle to extreme heats. When bonding sheet ablation material to the vertical, underside of horizontal surfaces, special fixtures or jigs are required to hold the ablation material in place until the adhesive jells and the molded sheets are very fragile and must be moved from the molds and subsequently handled with extreme care during the adhesive attachment thereof to the vehicle surface.

In view of these many limitations and disadvantages of the molding of ablation coating materials there is obviously a need in the art for a system that can employ the new type ablation materials directly to the vehicle surfaces. In the spray system, according to the present invention, obviously the need for molds and dies is eliminated, the size and thickness of the ablation material is not limited, and gradated coatings having density and composition changes throughout appear feasible. In addition, spray material can be cured in minutes with proper catalyst concentrations and the meticulous bonding operation as a separate step in the application procedure is eliminated thereby permitting changes in thickness of material required on some vehicle surfaces to be made with continuity of surface smoothness. In addition to these advantages the spray application of the ablation material eliminates trimming and fitting of cast material to provide a "one-piece" coating for irregular surface shapes contours of vehicle projections.

Spray techniques have previously been used to provide reinforced plastic, resinous, and the like, structural bodies, linings and coatings, but in each of these systems it was necessary to add the fiber filler material at the spray nozzle. That is, the fiber material reinforcement or filler was fed through a suitable cutter or chopper and admixed with the spray material at or adjacent to the spray nozzle. This system is not reliable for applying ablation protective coatings to reentry and hypersonic vehicles, for example, inasmuch as the coating applied does not result in a homogeneous mixture or complete wetting of the reinforcing fibers in the coating material and matting or clumping of the fiber is likely to occur. In addition, this prior art process required the use of bulky and complicated cutting and handling apparatus that necessitated the use of highly skilled operators and virtually eliminated the field application of spray coatings.

Accordingly, it is an object of the present invention to provide a method of making a sprayable fiber reinforced ablation material having a variety of fragile ingredients therein.

Another object of the present invention is the method of applying an ablation shield coating to a vehicle surface which eliminates undesirable seams and joints in the shielding.

Another object of the present invention is a method of applying ablation coatings to vehicle surfaces on vertical and undersides of horizontal vehicle surfaces without requiring the use of additional fixtures or jigs.

Another object of the present invention is a method of applying an ablation material to a vehicle surface in which the fragile cured material involved requires no additional handling prior to its use.

Another object of the present invention is a method permitting field application of ablation material to vehicle surfaces.

Another object of the present invention is a method of applying premixed elastomeric compounds containing a filler of fragile fibers and hollow microspheres as an ablation coating on vehicle surfaces.

A further object of the present invention is a method of producing a uniform cell size low density fiber reinforced foam ablator by control of spray pressure and material flow through the spray apparatus.

Another object of the present invention is a spray method by which honeycomb cells may be filled with a fiber reinforced ablator without the use of atomizing air.

Yet another object of the present invention is a method of reinforcing low density sprayed foam ablators by adding fibrous fillers to the premix spray compound.

According to the present invention, the foregoing and other objects are obtained by premixing specific quantities of microspheres and silica sphere filler materials, premixing a specific quantity of a polydimethyl siloxane resin, polydimethyl siloxane oil and homogeneously dispersing the desired quantity of reinforcing microquartz fibers therein and thereafter combining the desired quantities of each of these premixes, extending or reducing the viscosity of the combined mix by the addition thereto of a methylene chloride solvent to a sprayable viscosity and spraying the material through a standard or commercially available catalyst injection gun, along with a specific catalyst for the resin, onto the surface to be protected. The catalyst solution is also extended or reduced in viscosity prior to the spray operation and by use of the same viscosity reducing solvent. In most instances the viscosity of the catalyst solution will be approximately the same as that for the sprayable ablation compound.

A more complete appreciation of the present invention and many more of the attendant advantages thereof will be readily appreciated as the same becomes better understood by reference to the following detailed description when considered in connection with the accompanying drawings wherein:

The single figure of the drawing is a flow sheet representing the process for making the sprayable reinforced ablation material of the present invention.

Unlike prior arts spray applications of filled resinous coatings, the present invention requires no mechanical device, tubes, lines, or hoses to chop, cut or feed fibers into the spray gun head or spray pattern. Similarly, no regulating valves, hoppers, feedlines, nor additional spray guns of any type are required to introduced fillers into the atomization air line, resin feedline, spray gun head or spray pattern in the present invention. The technique employed herein utilizes a homogeneously premixed fiber filler elastomeric compound in a standard catalyst injection gun spray system. Homogeneous sprayed ablation coatings are produced by this technique without crushing the microspheres which is essential for optimum thermal protection and without breaking or clustering of the fibers which is essential to the char integrity of elastomeric ablation compounds not contained in a honeycomb cell reinforcing material.

The present invention may also be utilized to produce, by spray application, a foamed-in-place ablation coating having a matrix composed of fibers, fillers and elastomers. Through mechanical and/or chemical foaming actions, the aforementioned ablation compound and similar elastomeric ablation compounds may be applied as foamed-in-place coatings. Mechanically, this is accomplished by adjusting the pressures required to operate the catalyst injection gun spray system, the spray pattern, the extent to which the compound is extended, and/or combinations thereof. Chemically, this is accomplished through the addition of foaming agents to the resin and/or catalyst solutions, in addition to or replacement of the base or resin with the foaming elastomer with the appropriate changes being made to the catalyst solution when required. This spray application of porous or foamed ablation coatings is unique in that it allows premixed, homogeneously filled elastomer compounds to be made and applied as coatings using a minimum of equipment.

One ablation material composition capable of being sprayed in accordance with the present invention is the composition described and claimed in the copending application of Kenneth W. Wadlin for "Ablative Material for Heat Dissipation and Insulation," Ser. No. 363,032 now abandoned, filed Apr. 27, 1964, and assigned to the National Aeronautics and Space Administration. Other ablation compounds utilizing fragile filler materials, such for example the phenolic microspheres and hollow silica spheres as described in this copending application are also considered within the scope of the present invention.

Referring now to the flow sheet drawing and to specifically describe one example of the present invention the following sprayable material composition formulation of the ingredients therein is as follows (by weight):

(1) 75% silicone elastomer (polydimethyl siloxane resin)
(2) 10% phenolformaldehyde microspheres
(3) 11% silica spheres
(4) microquartz fibers (¼ inch long by 5 micron diameter)
(5) 5% polydimethyl siloxane oil (based on weight of elastomer)
(6) 50% methylene chloride solvent (based on weight of elastomer).

Specific exemplary examples of these ingredients are as follows:

(1) (a) General Electric's RTV 602 clear silicone potting compound
    (b) General Electric's RTV 603 clear silicone potting compound.
(2) Union Carbide Plastic Company's BJO 0930 phenolic microballoons.
(3) Emerson & Cuming Inc., Eccospheres, Grade SI.
(4) Johns-Manville Fiber Glass Inc., microquartz fibers, chopped, G-Strand, ¼" long x 5 micron diameter.
(5) General Electric's SF–69 silicone fluid.
(6) Methylene chloride solvent.

The catalyst solution required to cure the sprayable ablation material is formulated by weight of the following ingredients:

(1) 28% alkali type catalyst, exp. GE SRC–05 catalyst.
(2) 72% chlorinated solvent, exp. methylene chloride.

Polydimethyl siloxane resins and catalysts therefor are further described, for example, in U.S. Pat. No. 3,205,283 issued to Frank J. Modic and assigned to the General Electric Company on Sept. 7, 1965. Additional technical details of RTV–602 and catalysts GE SRC–04 and 05 are found in General Electric's "Supplementary Data" sheet for Silicones, Revision A, S–3B–3 for Data Book S–3B. Polydimethyl siloxane oil or General Electric's SF–69 Silicone Fluid is identified as comprising 100% dimethyl silicone polymers in Silicones Products Data Sheet, Revision B with the Silicones Technical Service Report #1223 dated Sept. 27, 1958 discussing the modification of some RTV compounds by the addition of silicone fluids. The phenolformaldehyde microballons are further described in Union Carbide Product Standards, issue number 5, dated Aug. 25, 1961, for product BJO–0930. The process for preparing these phenolformaldehyde microballoons is disclosed in U.S. Pat. No. 2,797,201 issued to Franklin Veatch et al. and assigned to The Standard Oil Company on June 29, 1957. Details of the Eccospheres, Grade SI are found in the Emerson and Cuming, Inc., Preliminary Technical Bulletin 14–2–2 as revised Oct. 6, 1961.

The phenolformaldehyde microspheres and silica spheres are used in the present invention as received from the manufacturers and are placed in separate metal containers and dried for one hour at 200° F. in an air circulating oven. The dried materials are then individually sieved through a 40 x 40 mesh screen into a one-cubic-foot twin shell V blender in the proportion of 940 grams of phenolformaldehyde microspheres to 1,034 grams silica spheres. The blender is sealed and the material subjected to further process by blending the material for three hours (plus or minus) ±5 minutes, at 200° F. (plus or minus) ±5° F. while subjecting the blender to a vacuum of 29 inches (plus or minus) ±1 inch, of mercury (Hg) at a rotational hopper speed of 10 r.p.m. At the end of this blending cycle, the 29-inch vacuum is maintained until the material has cooled to room temperature. The material is then discharged from the blender into appropriate airtight containers, such for example polyethylene, and the containers sealed and stored until the material is required for use.

The polydimethyl siloxane resin, polydimethyl siloxane oil, and microquartz fibers are weighed out in the proper proportions, dependent on the spray application requirements. The resin and oil are then combined and mixed thoroughly and the fibers incorporated into the combined fluids and the ingredients mixed thoroughly until the fibers are uniformly dispersed throughout the resin-oil fluid. The length of time required to uniformly disperse the fibers throughout the resin-oil fluid is dependent on the batch size of ablation material being compounded. This mixing operation may be effected either by hand or mechanical mixing, the essential requirement being that a homogeneous mixing or complete wetting of the individual fibers being effected. For batches of resin-fluid-fiber mixes exceeding one-half gallon mechanical mixing tends to be time saving and more effective. The addition of the fibers at this time results in separation of the individual fibers, one from another, and a homogeneous dispersion of the fibers throughout the compounded ablation material. Failure to introduce the fibers at this stage of compounding is critical since it is one factor that could result in a non-homogeneous ablation compound containing clusters of fibers. The correct proportions of the blended phenolformaldehyde microspheres and silica spheres required to complete the ablation material compound are then weighed out and combined with the fluid-fiber mix. This combination is thoroughly mixed, by hand or machine, until the blended spheres are homogeneously dispersed throughout the compound. The time required to perform any one of these mixing operations is dependent upon two factors (1) the quantity of material to be compounded and (2) the method of mixing. The mixing of the compound can be accomplished by either hand or machine mixing techniques as is conventional in the art. Standard pressure tanks may be conventionally equipped with a standard mixing and agitating device. Also, the ablation compound may be mixed in the resin tank, thereby eliminating the need for any adidtional mechanical mixer and the subsequent clean up operations involved to thus serve as an additional time saving factor.

For spray application, the ablation compound is extended or the viscosity reduced by the addition of a methylene chloride solvent. The amount of solvent used to extend the compound may be varied to suit the spray application involved. The catalyst solution is prepared by extending the proper catalyst with a methylene chloride solvent, preferably the same solvent used to extend the ablation compound. As in the case of the ablation compound, the amount of solvent used to extend the catalyst may be varied to suit the spray application involved; however, and, as discussed hereinbefore the viscosity of the materials prior to spray operation may be essentially identical although in some applications it may be desirable that the viscosity of the catalyst solution be much less than that of the sprayable ablation compound. The aforementioned sprayable ablation material composition formulation has a viscosity of 18,000 centipoise or less at 75° F. as measured by a Fisher-MacMicael Viscometer (catalog No. 15-346-500). The compounded ablation material is placed in a standard resin pressure tank and the catalyst solution in a standard catalyst pressure tank. A gel coat and overspray gun which provides individual control of both the ablation material and catalyst solution flow rates over a wide and variable range is used for the spray application of the materials. The gun spray head provides spray pattern control from a cone to a fan-type spray. One specific spray gun of this type that has been used in practice of the present invention is the Rand Gel Coat and Overspray Gun, Model P22.

The ablation material and catalyst solution may be sprayed at variable deposition rates and the cure time of the spray material may be varied from several minutes to over an hour. The compound may be sprayed on vertical surfaces in coatings ranging from several mils to a virtually unlimited thickness without sagging or running by controlling the catalyst solution flow rate. In preliminary tests, the ablation compound described hereinabove has been sprayed over 400 mils (0.400″) in thickness without sagging or running. This solvent-free, cured ablation compound spray has a density of 35.61 pounds per cubic-foot.

This process allows the operator to change the filler content by percentage of fillers used and by elimination and/or addition of other ingredients and/or fillers. A wide range of fluids and solvents may be used and varied to suit particular applications in the extending or thinning of both the ablation compound and catalyst. The type of catalyst may also be changed to suit a specific application.

The air pressure required to actuate the spray system of the present invention can be varied to provide additional control over the ablation compound and catalyst flow rates, as is conventional, to thereby give increased control over deposition and cure rates.

The sprayable ablation compound of the present invention has been successfully sprayed at air pressures ranging from ten to one hundred p.s.i.g. on the resin tank containing the ablation compound. The atomization and operation pressure of the catalyst injection spray gun utilized ranges from seventy to one hundred p.s.i.g. The pressure on the tank containing the catalyst solution may vary from five to twenty p.s.i.g. Due to the greater control permitted by the conventional equipment used over the catalyst solution, the catalyst tank pressure is normally used at a constant pressure of twenty p.s.i.g. The operation pressures of the equipment may vary slightly due to the configuration of the object to which material is being applied and the coating thickness required for a particular ablation operation.

As is readily seen from the above description and, unlike prior art spray applications of filled resinous coatings, the present invention requires no mechanical devices, tubes, lines, or hoses to chop, cut, or feed fibers into the spray gun head or spray pattern. Similarly, no regulating valves, hoppers, feed lines or additional spray guns of any type are required to introduce fillers into the atomization air line, resin feed line, spray gun head or spray pattern inasmuch as the novel technique employed herein utilizes a homogenously premixed fiber-filler elastomeric compound in a standard catalyst injection gun spray system. Homogenous spray ablation coatings are produced by this technique without crushing the hollow spheres, which is essential for optimum thermal protection, and without breaking or clustering of the fibers, which is essential to the char integrity of the elastomeric ablation compounds not contained in a honeycomb cell reinforcing material.

It is thus seen that the present invention provides a spray application that is unique in that it allows the application of premixed, filled elastomeric compounds containing fragile hollow spheres and fibers to be made simultaneously using a minimum amount of equipment. This is unlike the prior art spray application of filled resinous coatings wherein the filler material had to be added to the composition as it was sprayed to prevent breaking or clustering of the fibers.

Although the invention has been described in relation to a specific ablation material, it is to be readily understood that any homogeneously mixed elastomeric compound containing any type of fragile filler may be employed in accordance with the present invention. The essential feature of the present invention being that the fibers must be homogenously mixed with the elastomer prior to the addition of other fillers to the elastomer.

The specific embodiments of the invention described herein are to be considered as illustrative and not exhaustive.

There are obviously many modifications and variations of the present invention possible in the light of the above teachings. It is therefore to be understood that the invention may be practiced otherwise than as specifically described.

What is claimed as new and desired to be secured by Letters Patent of the United States is:

1. A method of providing an ablation coating to a surface that is to be subjected to high temperature, high velocity, gaseous flow, comprising:
   (1) mixing a predetermined quantity of phenolformaldehyde microspheres and silica spheres,
      (a) blending this mixture for approximately three hours at 200° F. and under 29 inches Hg vacuum while continuing the mixing,
      (b) cooling the resulting blend to room temperature while maintaining the vacuum conditions,
      (c) storing the cooled blend in an airtight container until ready for use,
   (2) mixing thoroughly a predetermined quantity of a polydimethyl siloxane resin and polydimethyl siloxane oil,
   (3) adding a quantity of fragile microquartz fibers to the resin-oil mixture, (a) mixing the resin-oil and microquartz, fibers until a homogeneous dispersion of the fibers is obtained,
   (4) weighing, separately, correct amounts of (a) the blended microspheres-silica sphere mix and (b) the resin-oil-microquartz fiber mix and blending these two mixes together for a homogeneous ablation compound,
   (5) extending said homogeneous ablation compound into a sprayable ablation material by adding and mixing a quantity of a methyl chloride solvent thereto to obtain the desired viscosity solution for a particular spray,
   (6) measuring a quantity of a base alkali-type catalyst and extending its viscosity by utilizing a quantity of the same methyl chloride solvent as used in step (5),
   (7) feeding said extended ablation compound and said extended catalyst into a conventional catalyst injection spray gun and,
   (8) spraying said compound and said catalyst at a controlled desired rate onto the surface to be protected.

2. The method of claim 1 wherein said sprayable ablation material is formulated by weight of the following ingredients:
   (1) 75% polydimethyl siloxane resin
   (2) 10% phenolformaldehyde microspheres
   (3) 11% silica spheres
   (4) 4% Microquartz fibers (¼" by 5 micron diameter)
   (5) 5% polydimethyl siloxane oil (based on the weight of the elastomer)
   (6) 50% methylene chloride solvent (based on the weight of the elastomer).

3. The method of claim 2 wherein the catalyst solution required to cure said sprayable ablation material is formulated by weight of the following ingredients:
   (1) 28% alkali-type catalyst specific for said polydimethyl siloxane resin, and
   (2) 72% methylene chloride solvent.

4. A method of introducing reinforcing microquartz fibers to an ablation material wherein the ablation material is adapted to be sprayed onto the surface to be protected and cured in situ on said surface comprising:
   adding a quantity of microquartz fibers to the resin used in said ablation material while said resin is in liquid uncured condition,
   blending the resin-fiber mixture until said fibers are homogeneously dispersed in said resin and thereafter reducing the viscosity of said resin and its catalyst such that the mixture may be sprayed by a conventional catalyst injection spray gun by adding a quantity of methylene chloride solvent and spraying the reduced viscosity resin and catalyst onto the surface to be protected and while said fibers remain in homogeneous dispersion in said resin solution.

5. The method of claim 4 wherein said ablation material also includes additional filler material, said additional filler material being added to said resin-fiber mixture prior to the reducing of the viscosity of said resin to a sprayable state, said additional filler material being selected from the group consisting of phenolformaldehyde microspheres, solid silica particles, and solid micra particles.

References Cited

UNITED STATES PATENTS

| | | | |
|---|---|---|---|
| 2,806,509 | 9/1957 | Bozzacco et al. | 161—161 |
| 2,850,421 | 9/1958 | Thomson | 117—104 |
| 2,885,303 | 5/1959 | Kaplan | 117—37 |
| 2,984,590 | 5/1961 | Anderson | 117—161ZA |
| 3,210,233 | 10/1965 | Kummer et al. | 161—68 |
| 3,429,838 | 2/1965 | Hersh | 260—25SI |

ALFRED L. LEAVITT, Primary Examiner

A. GRINALDI, Assistant Examiner

U.S. Cl. X.R.

117—126, 161; 260—38